US007082200B2

(12) United States Patent
Aboba et al.

(10) Patent No.: US 7,082,200 B2
(45) Date of Patent: Jul. 25, 2006

(54) ESTABLISHING SECURE PEER NETWORKING IN TRUST WEBS ON OPEN NETWORKS USING SHARED SECRET DEVICE KEY

(75) Inventors: Bernard D. Aboba, Bellevue, WA (US); Toby L. Nixon, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 812 days.

(21) Appl. No.: 09/948,475

(22) Filed: Sep. 6, 2001

(65) Prior Publication Data

US 2003/0044020 A1   Mar. 6, 2003

(51) Int. Cl.
  *H04K 1/00* (2006.01)
  *H04L 9/00* (2006.01)
  *G06F 7/04* (2006.01)
(52) U.S. Cl. ..................... 380/273; 713/163
(58) Field of Classification Search ............... 380/273, 380/278; 713/154, 163; 709/201, 229, 221, 709/248
  See application file for complete search history.

(56) References Cited

U.S. PATENT DOCUMENTS

| | | | | |
|---|---|---|---|---|
| 4,972,472 A | * | 11/1990 | Brown et al. | 380/277 |
| 5,146,497 A | * | 9/1992 | Bright | 380/273 |
| 5,208,859 A | * | 5/1993 | Bartucci et al. | 380/45 |
| 5,301,232 A | * | 4/1994 | Mulford | 380/273 |
| 5,325,432 A | * | 6/1994 | Gardeck et al. | 380/273 |
| 5,381,479 A | * | 1/1995 | Gardeck et al. | 380/273 |
| 5,394,556 A | | 2/1995 | Oprescu | |
| 5,398,932 A | * | 3/1995 | Eberhardt et al. | 463/29 |
| 5,471,532 A | * | 11/1995 | Gardeck et al. | 380/272 |
| 5,491,796 A | | 2/1996 | Wanderer et al. | |
| 5,491,800 A | | 2/1996 | Goldsmith et al. | |
| 5,546,574 A | | 8/1996 | Grosskopf et al. | |
| 5,559,967 A | | 9/1996 | Oprescu et al. | |
| 5,627,964 A | | 5/1997 | Reynolds et al. | |
| 5,655,148 A | | 8/1997 | Richman et al. | |
| 5,748,980 A | | 5/1998 | Lipe et al. | |
| 5,764,930 A | | 6/1998 | Staats | |
| 5,787,246 A | | 7/1998 | Lichtman et al. | |

(Continued)

FOREIGN PATENT DOCUMENTS

WO    WO 9642154 A1 * 12/1996

(Continued)

OTHER PUBLICATIONS

Blundo, Carlo et al. Perfectly Secure Key Distribution for Dynamic Conferences. Inf. Comput. 146(1): 1-23 (1998).*

(Continued)

*Primary Examiner*—Jacques H. Louis-Jacques
*Assistant Examiner*—Michael J. Simitoski
(74) *Attorney, Agent, or Firm*—Klarquist Sparkman, LLP

(57) ABSTRACT

A trust web keying process provides secure peer networking of computing devices on an open network. A device is initially keyed at distribution to an end user or installer with a device-specific cryptographic key, and programmed to respond only to peer networking communication secured using the device's key. The device-specific key is manually entered into a keying device that transmits a re-keying command secured with the device-specific key to the device for re-keying the device with a group cryptographic key. The device then securely peer networks with other devices also keyed with the group cryptographic key, forming a trust web. Guest devices can be securely peer networked with the trust web devices via a trust web gateway.

4 Claims, 7 Drawing Sheets

U.S. PATENT DOCUMENTS

| | | | |
|---|---|---|---|
| 5,787,259 | A | 7/1998 | Haroun et al. |
| 5,793,979 | A | 8/1998 | Lichtman et al. |
| 5,809,331 | A | 9/1998 | Staats et al. |
| 5,835,723 | A | 11/1998 | Andrews et al. |
| 5,881,230 | A | 3/1999 | Christensen et al. |
| 5,887,251 | A * | 3/1999 | Fehnel ..................... 455/411 |
| 5,903,728 | A | 5/1999 | Semenzato |
| 5,903,894 | A | 5/1999 | Reneris |
| 5,938,752 | A | 8/1999 | Leung et al. |
| 5,960,167 | A | 9/1999 | Roberts et al. |
| 5,960,439 | A | 9/1999 | Hamner et al. |
| 5,987,135 | A | 11/1999 | Johnson et al. |
| 5,995,624 | A | 11/1999 | Fielder et al. |
| 6,069,957 | A * | 5/2000 | Richards ..................... 380/281 |
| 6,085,236 | A | 7/2000 | Lea |
| 6,101,255 | A | 8/2000 | Harrison et al. |
| 6,101,499 | A | 8/2000 | Ford et al. |
| 6,115,545 | A | 9/2000 | Mellquist |
| 6,122,362 | A | 9/2000 | Smith et al. |
| 6,130,892 | A | 10/2000 | Short et al. |
| 6,185,613 | B1 | 2/2001 | Lawson et al. |
| 6,230,307 | B1 | 5/2001 | Davis et al. |
| 6,243,749 | B1 | 6/2001 | Sitaraman et al. |
| 6,263,506 | B1 * | 7/2001 | Ezaki et al. ................ 725/116 |
| 6,301,012 | B1 | 10/2001 | White et al. |
| 6,304,895 | B1 | 10/2001 | Schneider et al. |
| 6,330,597 | B1 | 12/2001 | Collin et al. |
| 6,334,178 | B1 | 12/2001 | Cannon et al. |
| 6,353,886 | B1 | 3/2002 | Howard et al. |
| 6,389,464 | B1 | 5/2002 | Krishnamurthy et al. |
| 6,401,132 | B1 | 6/2002 | Bellwood et al. |
| 6,438,744 | B1 | 8/2002 | Toutonghi et al. |
| 6,446,123 | B1 | 9/2002 | Ballantine et al. |
| 6,463,585 | B1 * | 10/2002 | Hendricks et al. ............ 725/35 |
| 6,487,167 | B1 | 11/2002 | Shaio |
| 6,571,277 | B1 | 5/2003 | Daniels-Barnes et al. |
| 6,584,566 | B1 * | 6/2003 | Hardjono .................... 713/163 |
| 6,587,450 | B1 | 7/2003 | Pasanen |
| 6,587,873 | B1 * | 7/2003 | Nobakht et al. ............ 709/219 |
| 6,633,979 | B1 | 10/2003 | Smeets |
| 6,754,829 | B1 | 6/2004 | Butt et al. |
| 6,772,331 | B1 | 8/2004 | Hind et al. |
| 2002/0004903 | A1 * | 1/2002 | Kamperman et al. ....... 713/182 |
| 2002/0018571 | A1 * | 2/2002 | Anderson et al. ........... 380/277 |
| 2002/0129247 | A1 | 9/2002 | Jablon |

FOREIGN PATENT DOCUMENTS

| | | |
|---|---|---|
| WO | WO 99/35856 | 7/1999 |
| WO | WO 02/01833 | 1/2002 |

OTHER PUBLICATIONS

Canetti, Ran et al. "SMuG.0", Aug. 1998 (co-located at IETF 42).*

Eschenauer, Laurent et al. A key-management scheme for distributed sensor networks. ACM Conference on Computer and Communications Security 2002: 41-47.*

Ghanem, Sahar M. et al. A Simple XOR-Based Technique for Distributing Group Key in Secure Multicasting. ISCC 2000: 166-171.*

Li, Xiaozhou Steve et al. Batch rekeying for secure group communications. WWW 2001: 525-534.*

Menezes, Alfred J. et al. Handbook of Applied Cryptography, 1997 CRC Press, pp. 551-581.*

Perrig, Adrian et al. ELK, A New Protocol for Efficient Large-Group Key Distribution. IEEE Symposium on Security and Privacy 2001.*

Sato, Fumiaki et al. A Push-Based Key Distribution and Rekeying Protocol for Secure Multicasting. ICPADS 2001: 214-219.*

Tanaka, Shin-ya et al. A Key Distribution and Rekeying Framework with Totally Ordered Multicast Protocols. ICOIN 2001.*

Steiner, Michael et al. Key Agreement in Dynamic Peer Groups. IEEE Trans. Parallel Distrib. Syst. 11(8): 769-780 (2000).*

Symantec Corporation. "Norton AntiVirus Corporate Edition Implementation Guide", 1999-2000, pp. 181-214.*

Yang, Richard Yang et al. Reliable group rekeying: a performance analysis. SIGCOMM 2001: 27-38.*

Zhang, Wensheng et al. Group Rekeying for Filtering Falso Data in Sensor Netowrks: A Predistribution and Local Collaboration-Based Approach, 2004.*

Zhu, Sencun et al. GKMPAN: An Efficient Group Rekeying Scheme for Secure Multicast in Ad-Hoc Networks. MobiQuitous 2004: 42-51.*

Ballardie, A. "Scalable Multicast Key Distribution". RFC1949, May 1996, <http://rfc1949.x42.com>.*

Dondeti, Lakshminath R. et al. "A Distributed Group Key Management Scheme for Secure Many-to-many Communication", 1999.*

Harney, H. "Group Key Management Protocol (GKMP) Architecture". RFC2094, Jul. 1997, <http://rfc2094.x42.com/>.*

Lee, Patrick P.C. "Distributed Collaborative Key Agreement Protocols for Dynamic Peer Groups", 2002.*

Menezes, Alfred J. et al. Handbook of Applied Cryptography, 1997 CRC Press, pp. 546-555.*

Tseung L. C. N. et al. "Guaranteed, Reliable, Secure Broadcast Networks", 2000 IEEE.*

Mittra, Suvo. "Iolus: A Framework for Scalable Secure Multicasting", 1997 ACM.*

Wallner, D. et al. "Key Management for Multicast: Issues and Architectures", Jul. 1999, <http://rfc2627.x42.com/t>.*

Kohl, J., et al., *The Kerberos Network Authentication Service (V5)*, RFC 1510, The Internet Engineering Task Force, 152 pages (Sep. 1993).

Doraswamy, N., et al., *IPSec—The New Security Standard for the Internet, Intranets, and Virtual Private Networks*, Prentice-Hall, Inc., Chapter 4, "IPSec Architecture," pp. 57-79 (1999).

Doraswamy, N., et al., *IPSec—The New Security Standard for the Internet, Intranets, and Virtual Private Networks*, Prentice-Hall, Inc., Chapter 7, "The Internet Key Exchange (IKE)," pp. 99-128 (1999).

Steiner, J., et al., *Kerberos: An Authentication Service for Open Network Systems*, pp. 1-15, undated.

Kent, S., et al., *Security Architecture for the Internet Protocol*, RFC 2401, The Internet Engineering Task Force, pp. 1-49 (Copyright © The Internet Society, 1998).

Harkins, D., et al., *The Internet Key Exchange (IKE)*, RFC 2409, The Internet Engineering Task Force, pp. 1-31 (Copyright © The Internet Society, 1998).

Harney, H., et al., *Group Key Management Protocol (GKMP) Specification*, RFC 2093, The Internet Engineering Task Force, pp. 1-19 (Jul. 1997).

Harney, H., et al., *Group Key Management Protocol (GKMP) Architecture*, RFC 2094, The Internet Engineering Task Force, pp. 1-17 (Jul. 1997).

Williams, A., *Securing Zeroconf Networks*, Internet-Draft, The Internet Engineering Task Force Zeroconf Working Group, pp. 1-14 (Nov. 2000).

Anderson, "FireWire System Architecture: Second Edition, IEEE 1394a," chapters 1-4 (1999).

Bennett et al., "Integrating Presence with Multi-media Communications," *White Paper*, Dynamicsoft., pp. 1-18 (2000).

Berners-Lee, T. et al., "Uniform Resource Identifiers (URI): Generic Syntax," RFC 2396, p. 1-40, Aug. 1998.

Cai et al., Internet Eng. Task Force (Internet Draft): *Simple Service Discovery Protocol/1.0*, Microsoft Corporation, Apr. 1999, p. 1-17.

"EIB Technology," EIB (2000).

Handley et al., "SIP: Session Initiation Protocol," *The Internet Society*, pp. 1-130 (Aug. 6, 2000).

"Home Plug & Play™ : CAL-based Interoperability for Home Systems," *HomePNP™ Specification, Version 1.0*, pp. 1-111, (Apr. 9, 1998).

"How it works," *Thalia*, pp. 1-3 (prior to filing date).

Kempf et al., *Service Location Protocol for Enterprise Networks: Implementing and Deploying a Dynamic Service Finder*, Wiley & Sons, Inc., Chapter 3, "Service Location Protocol Version 1," p. 45-80 (1999), and Chapter 6, "Security," p. 157-172, (1999).

"Lonworks Core Technology," *Echelon Corporation*, pp. 1-2 (2000).

Marples, "Naming and Accessing Network Appliances using extensions to the Session Initial Protocol," *SIP for Toaster*, Telcordia Technologies (2000).

Moyer et al., "Framework Draft for Networked Appliances using the Session Initiation Protocol," *Internet Engineering Task Force*, pp. 1-31 (Nov. 2000).

Moyer et al., "SIP for Light Bulbs, Using SIP to Support Communication with Networked Appliances," Telcordia Technologies (Aug. 2, 2000).

"Networked Appliance," *AR Greenhouse*, Telcordia Technologies, pp. 1-2 (Dec. 15, 2000).

"An Overview of Java Technology," www.sun.com/access/articles/JavaUniverseOverview.html, Mar. 1998.

Prindeville, P., Network Working Group: Request for Comments (1048): *BOOTP Vendor Information Extensions*, McGill University, Feb. 1988, p. 1-7.

Rosenberg et al., "An Application Server Architecture for Communications Services," *White Paper*, Dynamicsoft., pp. 1-13 (2000).

Rosenberg et al., "SIP Extensions for Instant Messaging," *Internet Engineering Task Force*, pp. 1-30 (Jun. 15, 2000).

Rosenberg et al., "SIP Extensions for Presence," *Internet Engineering Task Force*, pp. 1-77 (Jun. 15, 2000).

"Salutation Architecture Specification (Part-1), Version 2.0c," *The Salutation Consortium* (Jul. 1, 1999).

"Salutation Consortium Frequently Asked Questions," *The Salutation Consortium*, pp. 1-6 (prior to filing date).

"Sun Microsystems and Thalia Products Inc. to Collaborate to Co-Develop Network Software and Protocols for the Home, Results to Make Networked Appliances for the Home a Reality," *System News*, 1 page (2000).

"Sunbeam Joins Microsoft in the Universal Plug and Play Forum to Establish A 'Universal' Smart Appliance Technology Standard," *Sunbeam Corporation*, pp. 1-2 (2000).

Technical White Paper, "Jini Architectural Overview," *Sun Microsystems, Inc.* (1999).

"Time For Smart Talk Is Over, Sunbeam Trumps Small Appliance Industry with Smart Appliance Debut," *Sunbeam Corporation*, pp. 1-4 (2000).

Troll et al., Network Working Group: Request for Comments (2563): *DHCP Option to Disable Stateless Auto-Configuration in IPV4 Clients*, @Home Network, May 1999.

Tsang et al., "Requirements for Networked Appliances: Wide-Area Access, Control, and Interworking," *Internet Engineering Task Force*, pp. 1-9 (Sep. 2000).

Tsang et al., "SIP Extensions for Communicating with Networked Appliances," *Internet Engineering Task Force*, pp. 1-9 (Nov. 2000).

"Underlying Protocol of Echelon's LONWORKS® Network Adopted as New ANSI Standard, Free Reference Implementation Available to Developers," *Echelon Corporation*, pp. 1-2 (2000).

White Paper, "HAVi, the A/V digital network revolution," *HAVi Organization*, pp. 1-7 (1999).

\* cited by examiner

FIG. 2

| DEVICE CLASS | SECURITY LEVEL |
|---|---|
| VERY INEXPENSIVE | LEVEL 0: LINK LOCAL |
| INEXPENSIVE | TRUST WEB USING GROUP SYMMETRIC KEY ENCRYPTION |
| EXPENSIVE | TRUST WEB AND RESET BUTTON | ns
ESTABLISHING SECURE PEER NETWORKING IN TRUST WEBS ON OPEN NETWORKS USING SHARED SECRET DEVICE KEY

TECHNICAL FIELD

This invention relates to establishing trusted interaction among a sub-group of devices on an open network.

BACKGROUND AND SUMMARY

The cost of computing and networking technologies have fallen to the point where computing and networking capabilities are now being built into the design of many electronic devices in the home, the office and public places. The combination of inexpensive and reliable shared networking media with a new class of small computing devices has created an opportunity for new functionality based mainly on the connectivity among these devices. This connectivity can be used to remotely control devices, to move audio, video and still images in the form of digital data between devices, to share information among devices and with the Internet and to exchange structured and secure digital data to support things like electronic commerce. A prevalent feature of these connectivity scenarios is to provide remote access and control of connected devices and services from another device with user interface capabilities (e.g., a universal remote controller, handheld computer or digital assistant, cell phones, and the like). This trend of ubiquitous and pervasive networked computing leads toward a world in which all types of devices are able to effortlessly and seamlessly interconnect and interact.

Peer networking connectivity protocols are now being introduced to facilitate connectivity among these pervasive networked computing devices, such as by enabling a device to dynamically join a network, obtain an address on the network, convey its capabilities, and discover the presence and capabilities of other devices while avoiding burdensome set-up, configuration and software driver installation by the user. Examples of current such peer networking connectivity protocols include Universal Plug and Play (UPnP), JINI, HAVI, Salutation, and others.

The capability provided in these peer networking connectivity protocols of enabling discovery of the presence and capabilities of devices present on the network can pose a security problem in many use scenarios. For example, with the UPnP protocol as presently defined, devices periodically transmit a multi-cast HTTP announcement to the network. Further, devices respond to multi-cast HTTP discovery requests received from the network. The announcements and discovery responses identify the type of device and its capabilities, as well as its presence on the network.

The problem arises in that common networking media are open and accessible to any device with physical access to the networking media, such that this discovery capability may be accessible to use in eavesdropping or surveillance by unknown outsiders. For example, many home networks where UPnP is intended to be deployed may be built using wireless and power-line networking media (e.g., IEEE 802.11(b) wireless networking standard). Computing devices equipped with appropriate network adapters that are operated within range of the wireless network (e.g., in a van parked along the nearby street) or plugged into a home's exterior power outlets for a power-line network potentially could conduct discovery of the home's electronic appliances via the discovery capabilities of peer networking connectivity protocols. This capability might then be put to illicit use in criminal activity to "case" the house for valuable appliances (e.g., high-end audio/video media equipment) before attempting break-in and theft. This vulnerability of peer networking connectivity protocols is of particular concern because the discovery capability reveals not only the presence of devices on the home network, but also their nature.

Cryptographic techniques can be used to protect confidentiality of communications between devices (e.g., via cryptographic encryption of data), protect message integrity (e.g., via a cryptographic checksum), authenticate sender identity (e.g., via a digital signature or message integrity check), and verify information presented by the sender is certified by a trusted authority (e.g., via digital certificates). Cryptographic encryption techniques can be based on well known symmetric key and public key encryption algorithms, such as the National Bureau of Standards' Data Encryption Standard (DES), Triple DES, the National Institute of Standards and Technology's (NIST) Advanced Encryption Algorithm (AES), the Diffie-Hellman-Merkle Algorithm, the RSA Algorithm, and the ElGamal Algorithm. Cryptographic checksum techniques can use well known message-digest algorithms, such as MD2, MD4, MD5, SHA and SHA-5. Digital signatures can use the well known NIST Digital Signature Standard (DSS), and the Digital Signature Algorithm (DSA). A well known digital certificate technique includes the X.509 digital certificate standard of the International Telecommunication Union-Telecommunication Standardization Sector (ITU-T) and ISO/International Electrotechnical Commission (IEC).

One obstacle to use of cryptographic techniques to secure peer networking connectivity protocols is that encrypting such communications generally contradicts the objective of such protocols of enabling dynamic, immediate interaction among devices without burdensome user configuration requirements. More specifically, a general objective of peer networking connectivity is that a network-ready device can immediately inter-operate with other devices on a network upon joining the network. For example, a handheld computer, video camera or any other variety of device equipped with a wireless network adapter can begin inter-acting with other devices on a wireless Ethernet (802.11b standard) network upon coming within the reception range of the network and without requiring extensive user configuration or driver installations.

A more particular obstacle to use of these cryptographic techniques for securing discovery and other device interactions via peer networking protocols is the well-known key management problem. In the currently available IPSec Internet Security Protocol, for example, each pair of devices (e.g., devices A and B) generates a pair of cryptographic keys (e.g., keys $K_{Aout,Bin}$ and $K_{Bout,Ain}$) referred to as a "Security Association (SA)" to encrypt communications exchanged between the devices. (See, S. Kent, R. Atkinson, "Security Architecture for the Internet Protocol," IETF RFC 2401, November 1998.) The number of cryptographic keys required by the system therefore would generally increase exponentially with the number of devices that are to interact with all other devices in the system (e.g., $(n^2-n)$ cryptographic keys for 2 cryptographic keys per communicating pair of devices).

Establishing and managing this large number of keys can be a particularly significant impediment in common peer networking connectivity protocol contexts, such as in the home or small business environments, where professional network administration is not available. With a trend towards pervasive networked computing, such unmanaged networks may predominate. For example, device manufacturers cannot expect the average non-technically savvy consumers to be willing or capable of setting up complex cryptographic key configurations for their now-pervasively-networked home appliances. Again, the peer networking connectivity-enabled device should just inter-operate with other peer devices without extensive user configuration requirements.

Existing solutions to the key management problem, however, are inappropriate to secure communications in many applications of a peer networking connectivity protocol, due to their complexity, code size, requirement for a server intermediary, and/or requirement for end user configuration. The Kerberos protocol, for example, requires a Key Distribution Center (KDC) or trusted Kerberos server to manage an exchange between two devices to establish a "session key," for encryption of the devices' intercommunications during a session. (See, e.g., J. G. Steiner, B. Clifford Neuman, and J. I. Schiller, "Kerberos: An Authentication Service for Open Network Systems," Usenix Conference Proceedings, March 1988; and J. Kohl and C. Neuman, "The Kerberos Network Authentication Service (V5)," IETF RFC 1510, September 1993.) Peer networking connectivity protocols desirably facilitate peer-to-peer interaction of devices without requiring the presence of a central server on the network.

As further examples, the Internet Key Exchange (IKE) protocol (used for dynamically creating security associations in the IPSec protocol) is a hybrid protocol to negotiate, and provide authenticated keying material for, security associations between pairs of devices in a protected manner. (See, D. Harkins, D. Carrel, "The Internet Key Exchange," IETF RFC 2049, November 1998.) The Group Key Management Protocol (GKMP) creates key for cryptographic groups, distributes key to the group members, ensures (via peer to peer reviews) rule based access control of keys, denies access to known compromised hosts, and allow hierarchical control of group actions. (See, H. Harney, C. Muckenhirn, "Group Key Management Protocol (GKMP) Specification," IETF RFC 2093, July 1997.) Although IKE and GKMP are capable of producing cryptographic keys in a direct exchange between peer devices, the IKE and GKMP protocols are complex and have a code size that is too large for many small and inexpensive embedded computing device applications.

The present invention provides ways to secure communications in a peer networking connectivity protocol, such as to prevent discovery and other interactions with untrusted devices, while minimizing user configuration requirements. In one embodiment described herein, communications in a peer networking connectivity protocol among at least one class of trusted devices on a network are encrypted with a group cryptographic key. These devices respond only to discovery requests that are encrypted using the group cryptographic key, and send announcements that also are encrypted using the group cryptographic key. This encryption of the devices' peer networking connectivity communications using a group key effectively forms a trust web that permits peer networking connectivity among the trusted devices, while preventing untrusted devices that have not been keyed with the group cryptographic key from conducting discovery or accessing services of the trusted devices.

In this embodiment, devices initially have a device-specific cryptographic key when purchased by an end user. For example, the devices are keyed with individual device-specific cryptographic keys by their manufacturer. The device-specific cryptographic key preferably is unique to the individual device, but the same cryptographic key can be assigned to multiple commercially distributed devices (e.g., randomly, particular model of device, etc.). The device will then use the device-specific cryptographic key to encrypt and decrypt communications via the peer networking connectivity protocol. This means that the device will only accept communications (including discovery, re-keying commands, etc.) from a "trusted" device that possesses the same device-specific cryptographic key.

Upon installation or deployment of a new device in the user's network, the new device is re-keyed with the group cryptographic key, so that the new device can then inter-operate within a trust web of other devices that also are keyed with the group cryptographic key. In this embodiment, re-keying is accomplished by sending a re-keying command to the new device over a secure communications channel created by symmetric key encryption using the device-specific cryptographic key. For example, the re-keying command can be sent from a group keying device, which may be a group keying utility program run on a personal computer or other computing device on the network. The device-specific cryptographic key of the new device can be provided to the user on a label or other tag that comes attached to the new device. The user enters the device-specific cryptographic key into the group keying device and activates its re-keying process. In the re-keying process, the group keying device uses the device-specific cryptographic key to encrypt its communications with the new device, which may include discovery requests in the peer networking connectivity protocol as well as the re-keying command. In its re-keying command, the group keying device specifies the group cryptographic key for keying the new device (i.e., substituting for the prior device-specific cryptographic key). The new device is then keyed to use the group cryptographic key to inter-operate in the trust web of devices also keyed with the group cryptographic key.

This re-keying process has the advantage that only the user who has possession of the new device and its device-specific cryptographic key label is able to key the new device. Further, since the device is initially keyed to accept only peer networking connectivity protocol communications that are encrypted with the device-specific cryptographic key, the device is first re-keyed with the user's group cryptographic key before it is able to inter-operate with the user's other devices. This helps to prevent outside others who may gain access to the user's network from keying the user's devices, and helps prevent any tendency of consumers to leave initially un-keyed devices un-keyed (and hence open to possible discovery and control by outsiders as discussed above).

A further advantage of the re-keying process over manually keying each device in a trust web is that not all devices need be equipped with a key pad for manual entry of the group cryptographic key. Instead, the device-specific cryptographic key of the new device is entered into the keying device, which then securely transmits the group cryptographic key to the new device in the re-keying command. This permits devices that don't normally have numeric key pads (e.g., alarm clocks, furnaces, etc.) to be keyed with the group cryptographic key without being equipped with a numeric key pad.

In a further embodiment, a gateway acts as a two-way adapter between a "guest" device keyed with a "guest" cryptographic key and the trust web devices that are keyed with the group cryptographic key. The gateway converts communications in the peer networking connectivity protocol encrypted using the guest cryptographic key into communications encrypted using the group cryptographic key, and vice-versa. This enables the guest device to inter-operate in the trust web without having to provide the group cryptographic key to the guest device, which could potentially compromise the security of the trust web.

Additional features and advantages will be made apparent from the following detailed description of the illustrated embodiment which proceeds with reference to the accompanying drawings.

BRIEF DESCRIPTION OF THE DRAWINGS

FIG. 2 is a table listing security techniques for various classes of devices in the pervasive networked computing environment of FIG. 1.

DETAILED DESCRIPTION

Figure 1:
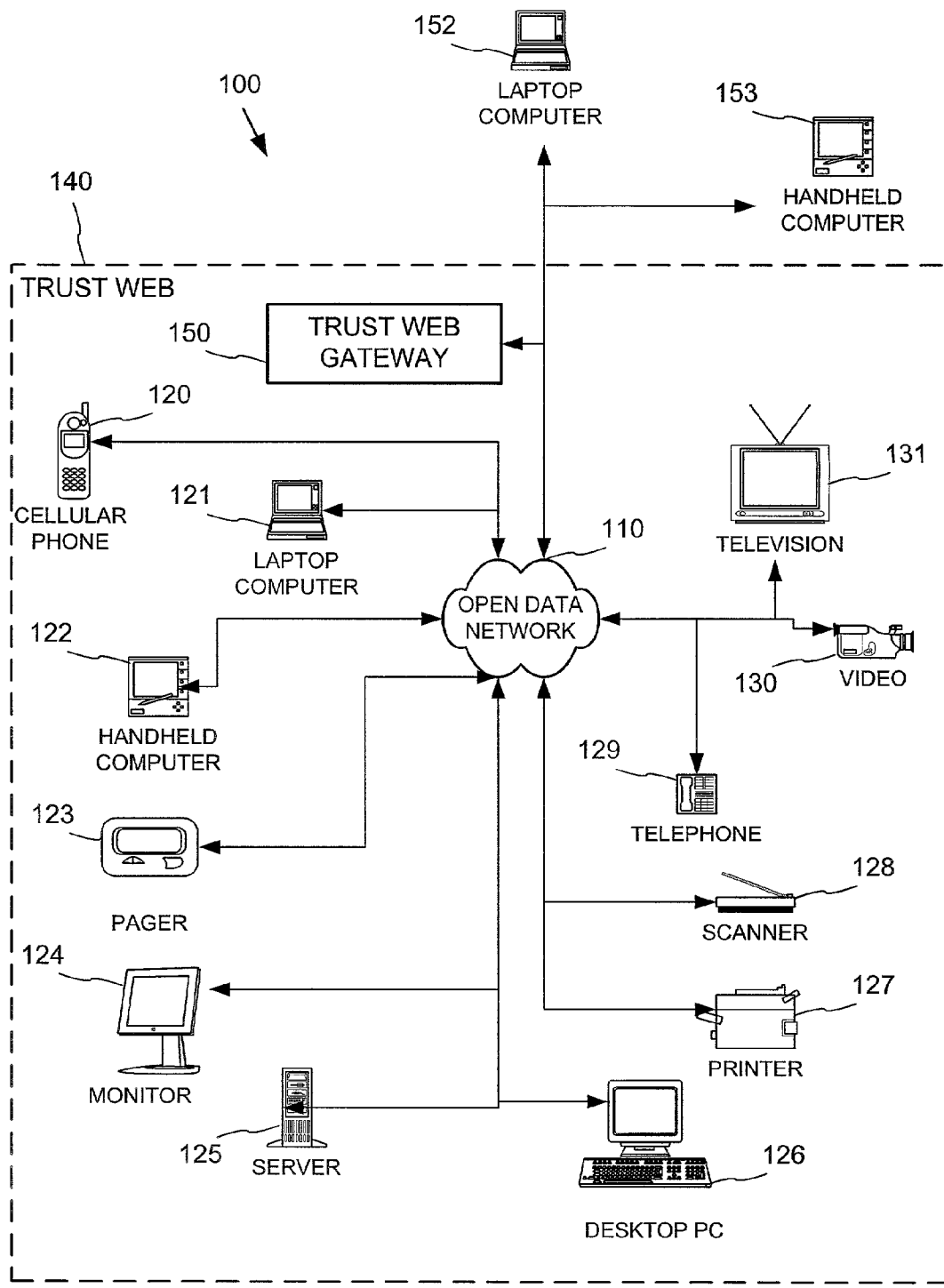
FIG. 1 is a network diagram depicting a pervasive networked computing environment where groups of networked computing devices are keyed with a group cryptographic key in accordance with an embodiment of the present invention to interact in trust webs.

With reference to FIG. 1, an implementation of the present invention provides keying of networked computing devices 120–131 on an open access data network 110 in setting 100 to establish a trust web 140 in which the devices can securely interact via peer networking connectivity. FIG. 1 depicts an illustrative pervasive networked computing environment 100 where a large variety of everyday devices are equipped with networking and computing capability (e.g., the networked computing devices 120–131) to communicate via the open data network 110. The depicted networked computing devices 120–131 (including a cell phone, laptop computer, handheld computer, pager, monitor, server computer, desktop computer, printer, scanner, telephone, video camera, and television) are exemplary of the wide variety of networked computing devices that can support peer networking connectivity in a trust web. The open data network 110 also can encompass any of a variety of networking media and networking technologies that permit multi-access, broadcast data communications among any devices with physical access to the network (e.g., via an appropriate network adapter in the area of the network), including power line networking, radio frequency networking (e.g., Bluetooth, 802.11b Wireless Ethernet, etc.), Ethernet, Cable Modem networks, satellite data networks, among others. In general, the network 110 is a local area network, such as in a home, small office, or large corporate office setting, but can encompass other settings, such as public facilities, and more geographically distributed networks.

In a typical setting, all networked computing devices 120–131 on the network 110 are keyed alike to form a single trust web 140. Also, the typical device supports keying with a single group cryptographic key to participate in the single trust web. Alternatively, devices in some network settings can be separately keyed to form multiple trust webs on the same network. Further, the devices in some implementations can be designed to support keying with multiple group cryptographic keys to simultaneously participate in multiple trust webs.

The devices 120–131 that are keyed with the same group cryptographic key encrypt communications in a peer networking connectivity protocol using the group cryptographic key. This encryption using the group cryptographic key forms the trust web 140 among the devices. Individual devices authenticate that a communication is from another member of the trust web when the communication properly decrypts using the group cryptographic key into a valid peer networking connectivity protocol communication, since the communication could then have only been sent from another device that also possesses the group cryptographic key. The device responds only to communications in the peer networking connectivity protocol that are so authenticated. Since the communications among the networked computing devices 120–131 in the trust web are encrypted, outside devices that may gain physical access to the network will not be able decrypt the communications.

In general, the devices 120–131 in the trust web 140 use symmetric key cryptography techniques to encrypt and decrypt their inter-communications, which may be well known symmetric key encryption algorithms, such as the National Bureau of Standards' Data Encryption Standard (DES), Triple DES, and the National Institute of Standards and Technology's (NIST) Advanced Encryption Algorithm (AES).

With reference now to FIG. 2, the scheme for securing communications in the peer networking connectivity protocol on the network 110 can include multiple security measures or techniques (security levels) for various classes of devices. In this implementation, the scheme provides different security measures for three classes of networked computing devices. Very inexpensive devices (such as light switches, toasters, clocks and like devices that would be equipped with limited computing resources inadequate for encryption due to cost constraints) use a link local security measure to secure communications per a peer networking connectivity protocol. The very inexpensive devices, for example, may lack sufficient processing capacity for encryption/decryption, or may lack re-writeable persistent data storage for keying with a group cryptographic key upon installation or deployment. With this link local security measure, these very inexpensive devices respond only to peer networking connectivity communications from devices with Internet Protocol (IP) addresses in the local loop (e.g., link-local IP addresses as described in S. Cheshire and B. Aboba, "Dynamic Configuration of IPv4 Link Local Addresses <draft-ietf-zeroconf-ipv4-linklocal-03.txt>," IETF Internet Draft, Jun. 22, 2001). This security measure helps to protect against security threats from remote sources, such as attempts to control devices on a home network from the Internet. The devices may be subject to discovery and other peer networking connectivity communications of outside devices that have direct physical access to the local network 110. However, because the devices protected with this level of security are very inexpensive, the threat of theft is minimal.

The inexpensive devices are protected via keying with a group cryptographic key to interact in a trust web on the local network as described herein. These inexpensive devices include persistent data storage or memory (e.g., an EPROM, flash memory, or like re-writeable memory device) for storing a cryptographic key. These inexpensive devices initially are keyed at manufacture (or otherwise prior to distribution to end users) with a device-specific cryptographic key (i.e., the device-specific cryptographic key is burned into or otherwise stored in the device's persistent memory). This device-specific cryptographic key also is made available to the end user or installer, such as by printing on a label attached to the device (either in human-readable text form, or as a bar-code or other machine-readable form), in accompanying product literature, providing via telephone or the Internet (e.g., in a telephone or on-line registration process), or otherwise. In a trust web keying process described below, the devices are re-keyed with the group cryptographic key so as to operate in the trust web 140 (i.e., the group cryptographic key is written into the device's persistent memory). The devices also are equipped with sufficient processing capability and programming to perform the encryption algorithms for the trust web interaction.

Devices of the expensive device class are equipped like the inexpensive device class for trust web security, and are further equipped with a reset button. The reset button preferably is designed to avoid unintended activation, such as recessed, or other less accessible placement on the device. On actuation, the reset button causes the device to revert to its initial device-specific cryptographic key. This permits re-deploying the device into a new trust web (with a new group cryptographic key) by repeating the trust web keying process described below, such as in the event of loss of the group key, sale of the device, re-deploying the device on a new network, or other need to re-key the device to a new trust web.

Figure 3:
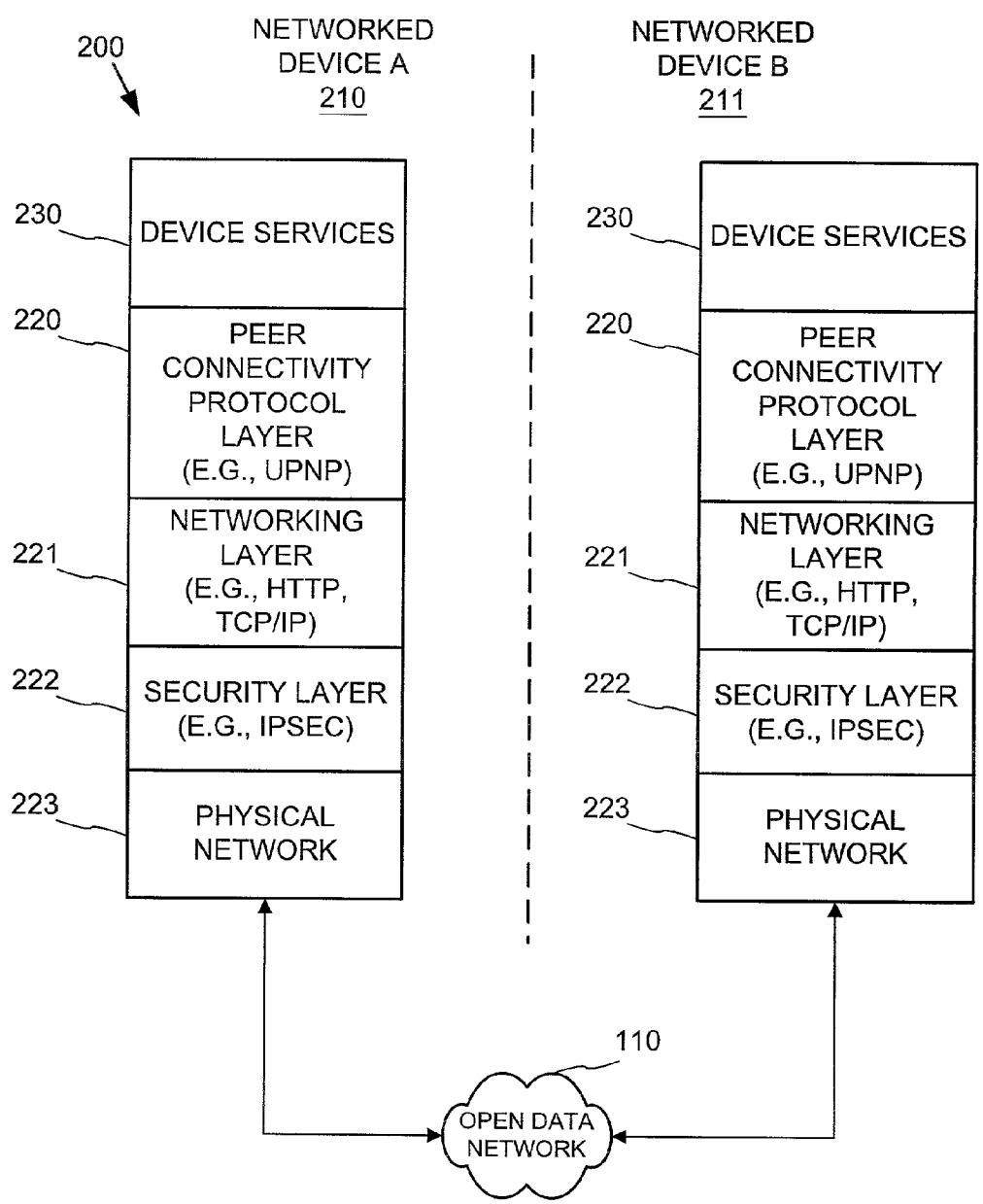
FIG. 3 is a block diagram of layers in a software architecture for a secure peer networking connectivity protocol in the networked computing devices of FIG. 1.

With reference now to FIG. 3, a networking software architecture 200 for exemplary networked devices 210, 211 in the inexpensive or expensive device classes (FIG. 2) out of the networked computing devices 120–131 in the trust web 140 (FIG. 1) is organized as a stack of networking services layers 220–223 that provide communications between device services 230 of the two networked devices. The device services 230 are the implementation (e.g., in software, firmware or hardware) of the devices' capabilities (for example, "play," "pause," "stop," and "rewind" operations in a video cassette recorder).

Communications between the devices 210, 211 over the network are passed from the device services layer 230 to a peer networking connectivity protocol layer 220. This software layer implements services of a peer networking connectivity protocol, for example, the UPnP protocol or other peer networking connectivity protocol. In general, this layer sends and responds to messages per the peer networking connectivity protocol, for addressing, discovery, and control of or by other devices on the network. For more information on the UPnP protocol, see, "Universal Plug And Play Architecture, version 1.0" Microsoft Corporation (Jun. 8, 2000) available from the UPnP Forum website (at "www.upnp.org"). In the UPnP protocol, the peer networking connectivity protocol communications are sent between the devices using the well-known HTTP and TCP/IP networking protocols, which are implemented in the networking protocol layer 221. Other known networking protocols can be used in alternative implementations, such as using other peer networking connectivity protocols.

For the networked computing devices 120–131 in the trust web 140 (FIG. 1), the communications between the devices in the peer networking connectivity protocol are encrypted and decrypted in a networking security layer 221 of the software architecture 200. In one implementation, the security layer 221 places the IP packets containing peer networking connectivity protocol communications from the layers 220, 221 into secure IP network packets that conform to the IPSec security standard. In accordance with the IPSec standard, these secure IP packets add an IPSec header and encrypt the data payload of the packet in accordance with a Security Association (SA) that defines the cryptographic key(s) for the encryption algorithm. In the case of the devices 210, 211, the cryptographic key with which the device has been keyed is used to encrypt the payload of the IPSec packet.

The physical network layer 223 provides the transmission of data between the devices over the network 110, and may include the device driver, network adapter and networking medium over which the secure packets are transmitted between the devices.

In the networked computing devices 120–131 (FIG. 1), the software architecture 200 is configured so that the peer networking connectivity protocol layer 220 responds only to discovery and control requests in the peer networking connectivity protocol that have been secured by encryption using the device's cryptographic key. The software architecture is further configured so that discovery announcements in the peer networking connectivity protocol also are secured by encrypting using the device's cryptographic key. This limits the devices to discovery and control via the peer networking connectivity protocol by only those other devices who possess the cryptographic key. For example, only other devices in the trust web 140 that also are keyed with the same cryptographic key can discover and control the devices via the peer networking connectivity protocol.

The software architecture 200 also can be configured to permit the devices to discover and control via the peer networking connectivity protocol other devices that are not keyed with the devices' cryptographic key by sending out non-secured discovery and control requests. For example, this permits the devices 120–131 to discover and control other devices of the very inexpensive device class (but not be discovered or controlled by such other devices), which do not encrypt peer networking connectivity protocol communications but rely on link local security.

Figure 4:
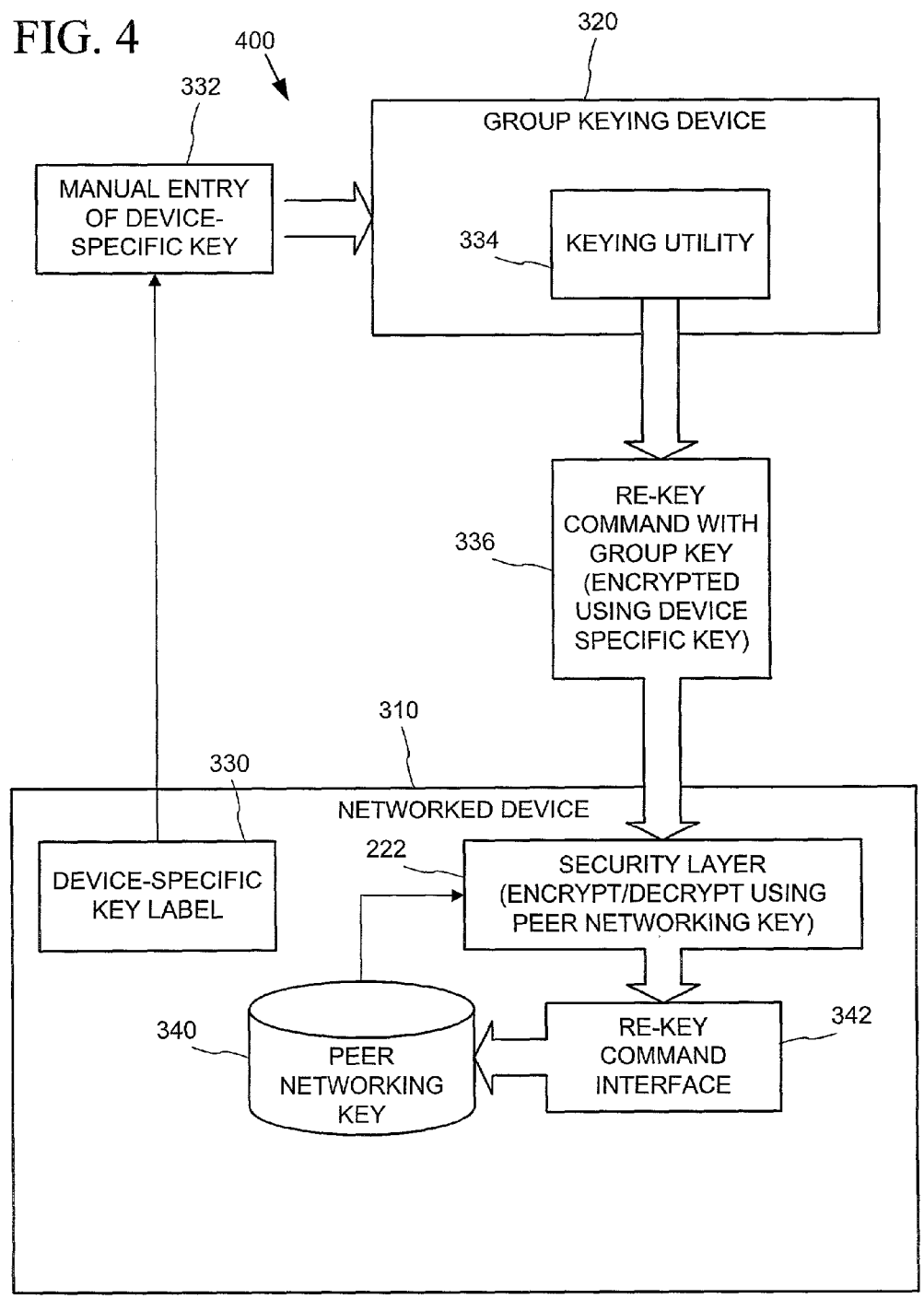
FIG. 4 is a data flow block diagram illustrating re-keying of a networked computing device, such as in the pervasive networked computing environment of FIG. 1, by a keying device via an encrypted communications channel using a device-specific symmetric cryptographic key.
Figure 5:
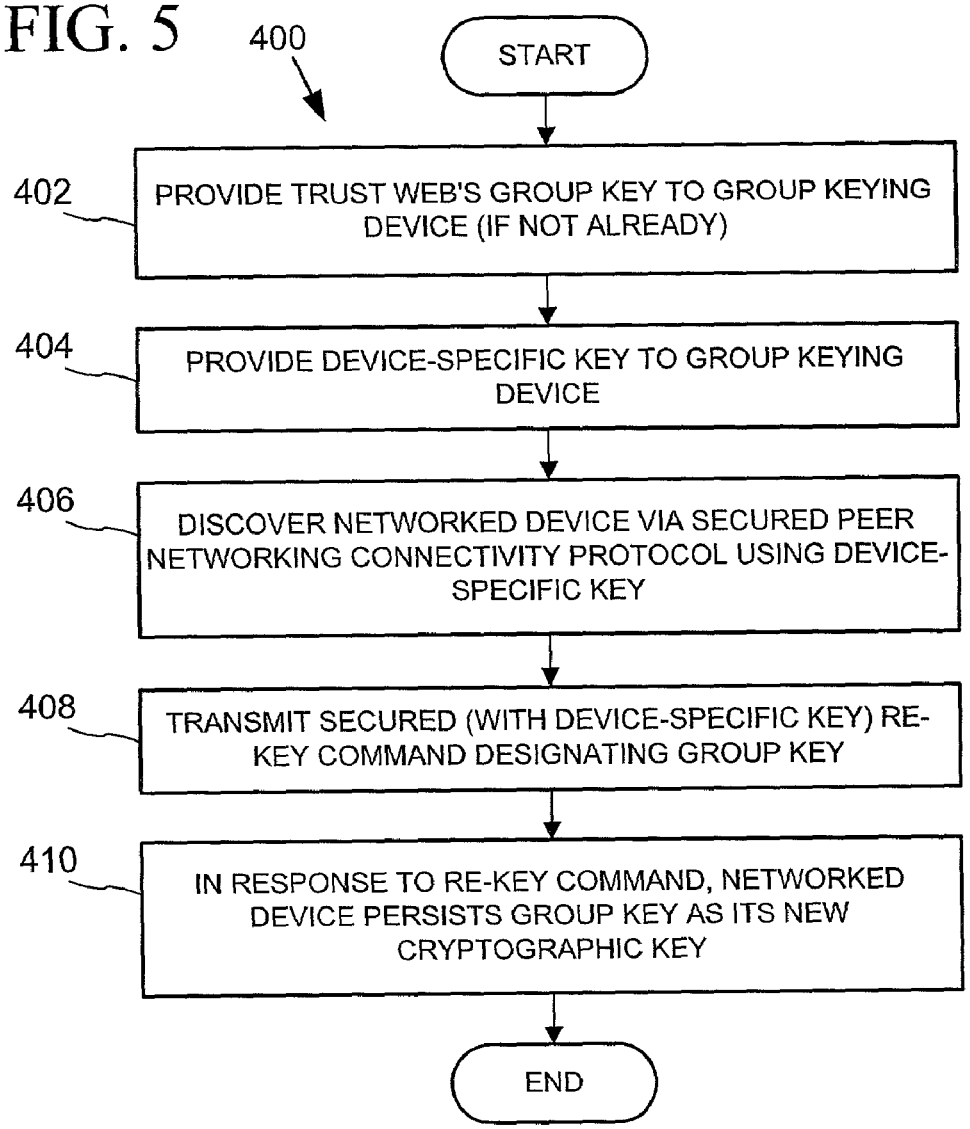
FIG. 5 is a flow diagram of a re-keying process performed by the keying device of FIG. 4 to establish trust group interaction between networked computing devices, such as in the pervasive networked computing environment of FIG. 1.

FIGS. 4 and 5 depict an implementation of a trust web keying process 400 for keying a networked device 310 (e.g., any of the networked computing devices 120–131 of FIG. 1) with the group cryptographic key to establish the trust web 140. As described above, the networked device 310 is initially keyed with a device-specific cryptographic key, which also is provided to the end user or installer, such as via a label attached to the device. With this initial keying, the device responds only to communications in the peer networking connectivity protocol that are secured by encryption using the device's device-specific cryptographic key.

The device specific cryptographic key can be a numeric key that is unique to the individual device. In some implementations, the key need not be globally unique for each device, but preferably is sufficiently random to minimize the possibility of cryptanalytic attack by an unauthorized outsider. The serial number of the device (or part thereof) can be used in some implementations, but is not preferred because serial numbers generally have a low variance in typical product lines (e.g., due to high chronological dependence, etc.). In one implementation, a suitable algorithm for generating the device-specific cryptographic keys is the one used for software compact disk copy protection described in Yuval et al., "Method And System For Controlling Unauthorized Access To Information Distributed To Users," U.S. Pat. No. 5,586,186.

The device 310 further supports a re-keying command interface 330 that responds to a re-keying command designating a new cryptographic key for the device. The re-keying command interface 330 can form part of the peer networking connectivity protocol (in other words, an extension of the protocol). As with other communications in the peer networking connectivity protocol, the device only accepts re-keying commands (i.e., processes the command via the re-keying command interface) that were sent secured by encryption using the device's current cryptographic key.

In the trust web keying process 400, the end user or installer utilizes a group keying device 320 to key the networked computing devices 120–131 to become members of the trust web 140 (FIG. 1). The group keying device 320 can be a specific use keying device, but more typically is a PC, laptop or handheld computer that runs a keying utility program 334 that transmits the re-keying command to the networked device 310. In a typical implementation, the group keying device 320 provides a keyboard, keypad, bar-code scanner or other input device for entry of the device-specific cryptographic key.

As an initial action 402 in the trust web keying process 400, the end user or installer provides the group cryptographic key for the trust web 140 to the group keying device 320. This action may be unnecessary if the group keying device 320 already possesses the group cryptographic key, such as where the group keying device 320 has already been used to key another device for the trust web. If the group cryptographic key has not yet been generated, the group keying device can generate the group cryptographic key. For convenience in some implementations, the group keying device can generate the group cryptographic key using a key generating algorithm (e.g., via a hash function) based on a password provided by the end user. This facilitates re-constructing the group cryptographic key with another group keying device, in case the group keying device is lost or other circumstance where the initial group keying device is later unavailable to key further devices for the trust web. The group keying device 320 may store the group cryptographic key for later use in keying other devices. In some alternative implementations, the end user or installer may provide the group cryptographic key to the group keying device for each device to be keyed.

In a next action 404 (FIG. 5), the end user or installer enters the device-specific cryptographic key into the group keying device 320. For example, the user may read the device-specific cryptographic key printed on the label 330 on the networked device 310, and manually type the cryptographic key into the group keying device using a keyboard, keypad or like as indicated at block 332 of FIG. 4. In some implementations, the entry of a lengthy device-specific cryptographic key can be facilitated by use of bar code scanner to read the key in bar-code form from the label 330.

At a next action 406, the group keying device 320 obtains a network address of the networked device 310, such as via a discovery process. For example, the group keying device 320 can send a multi-cast discovery request as per the peer networking connectivity protocol that is encrypted using the device-specific cryptographic key. Since the networked device 310 is keyed with the device-specific cryptographic key, the networked device 310 responds to the discovery request by sending a discovery response as per the peer networking connectivity protocol, which identifies the networked device's network address (e.g., an IP address).

With the networked device's address, the group keying device 320 directly sends a re-keying command to the networked device 310 at action 408. Again, the group keying device 320 secures the re-keying command by encrypting using the device-specific cryptographic key. This creates a secure communications channel between the group keying device 320 and the networked device 310 for conveying the group cryptographic key of the trust web 140 (FIG. 1). Since the command is securely encrypted with the networked device's current cryptographic key, the networked device 310 accepts the group keying device's re-keying command as authentic.

In response to the re-keying command, the re-keying command interface 342 of the networked device at action 410 persistently sets the networked device's cryptographic key for peer networking (in persistent key storage 340 of the networked device in FIG. 4) to be the group cryptographic key. The networked device 310 is now keyed with the group cryptographic key to interoperate with other devices 120–131 in the trust web 140 via the peer networking connectivity protocol.

In some implementations of trust web keying, the group keying device 320 can provide the capability to mass re-key the networked devices 120–131 in the trust web 140. This can be useful to facilitate periodically refreshing the group key so as to be less susceptible to cryptoanalytic attack. In a mass re-key operation, the group keying device 320 discovers the networked computing devices that are members of the trust web and transmits a re-keying command to each device. In some implementations, the group keying device can use a multi-cast re-keying command. The devices will have to be powered on and present on the network for the re-keying. In some implementations, the re-key command interface of the at least some of the networked devices 310 can be programmed so as to respond to any devices that may thereafter communicate using the prior group cryptographic key up to an expiration time by transmitting a re-key command secured with the prior group cryptographic key and designating the new group cryptographic key. This propagates the new group cryptographic key to trust web member devices that may have been powered down or otherwise absent from the network during the group keying device's mass re-keying process.

With reference again to FIG. 1, some implementations of trust web peer networking may provide a trust web gateway 150 to permit interaction of the trust web's networked computing devices 120–131 with guest devices 152–153, without having to provide the trust web's cryptographic key to such guest devices. This is useful in many use scenarios for home, office and public networks where the network owner or operator may wish to allow use of his or her networked computing devices by outsiders. For example, a home owner hosting a neighborhood association meeting or other gathering may wish to allow a guest to have temporary access to the owner's networked devices to print a document to the owner's networked printer, or display a presentation on a networked monitor. However, it would be undesirable to key the guest's device with the trust web's group cryptographic key for such temporary access.

Figure 6:
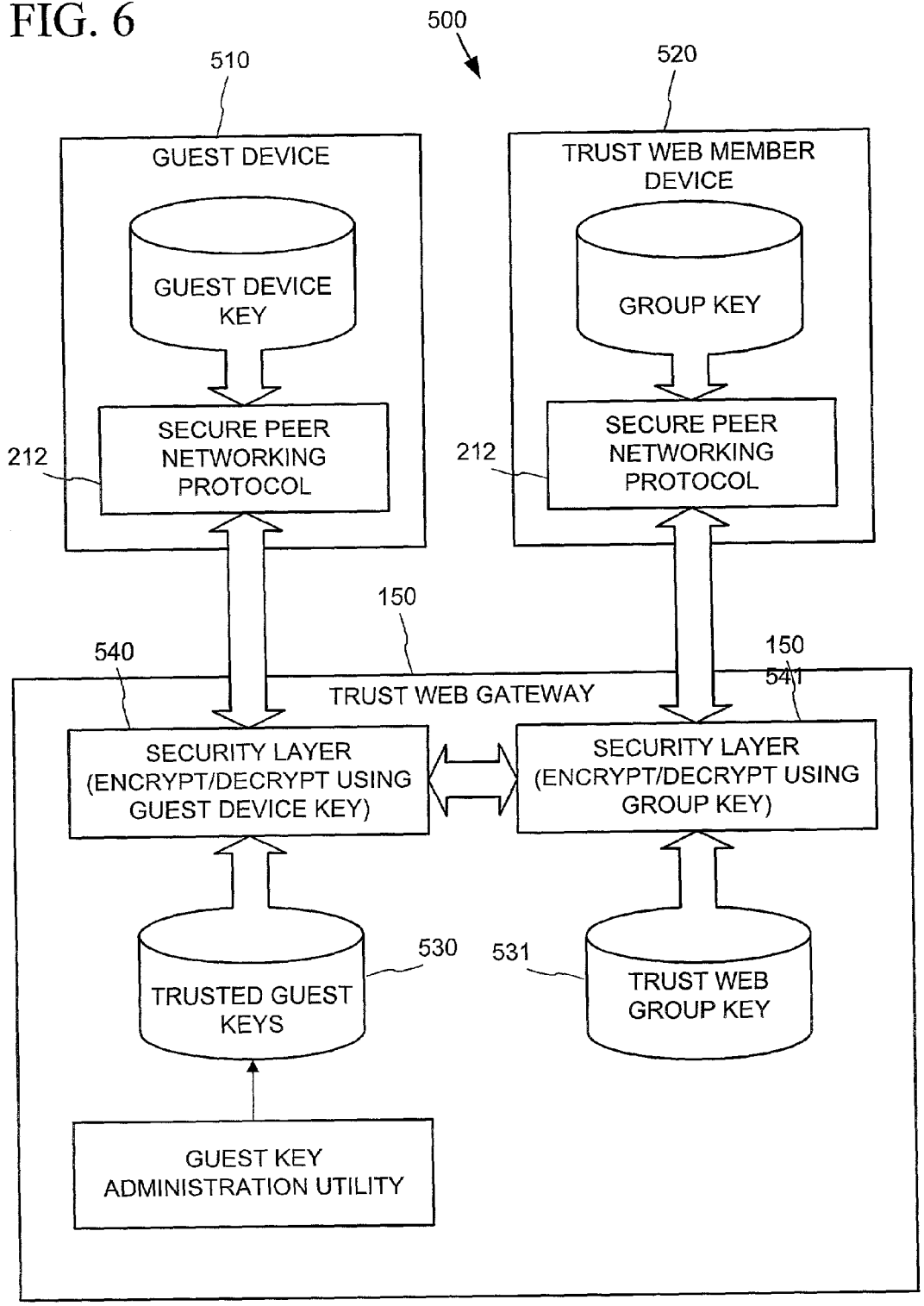
FIG. 6 is a block diagram of a trust web gateway for use with the trust web in the pervasive networked computing environment of FIG. 1.

Turning now to FIG. 6, the trust web gateway 150 is a device that serves as an adapter for secure peer networking connectivity interaction between a guest device 510 (e.g., devices 152–153 of FIG. 1) and a trust web member device 520 (e.g., devices 120–131 of FIG. 1). The trust web gateway 150 converts peer networking connectivity communications from the guest device 510 that are secured with a guest cryptographic key to peer networking connectivity communications secured using the trust web's group cryptographic key to the trust web member device 520, and conversely converts the trust web member device's communications secured using the group key into communications using the guest key to the guest device. For this conversion, the trust web gateway is equipped with storage 530, 531 for the group key and guest keys. Storage 530 for the group key preferably is persistent, but the guest keys need not be persistently stored.

The trust web gateway 150 is keyed with the group cryptographic key of the trust web 140, such as via the trust web keying process 400 described above. The trust web gateway 150 also is provided with the current cryptographic key of the guest device 510. The guest key may be the original device-specific key of the guest device 510. In the case where the guest device is one of the expensive device class, the guest device 510 can be reset to this original device-specific key using the reset button. The guest device can then be keyed for deployment by its owner in another trust web, then later reset to the original device-specific key for use as a guest device on the trust web 140. The guest key is generally manually entered in the trust web gateway 150 via a keyboard, keypad, bar code scanner or the like. The trust web gateway 150 can be programmed with a guest key administration utility program to manage entry, storage and deletion of guest keys.

The trust web gateway 150 is equipped with a networking security layer 540–541 for encryption/decryption of peer networking connectivity communications using the guest and group cryptographic keys. Once keyed with the group cryptographic key and the guest key(s), the trust web gateway 150 decrypts any peer networking connectivity communication received from the network using each of the group cryptographic key and the guest key(s). If the communication received from the network 110 (FIG. 1) validly decrypts using the group cryptographic key in networking security layer 541, the trust web gateway 150 re-encrypts the communication using the guest cryptographic key(s) for transmission to the guest device(s) 510. Conversely, if the communication validly decrypts using any guest key, the trust web gateway 150 re-encrypts the communication using the group cryptographic key for transmission to the trust web's networked devices. In this way, the guest device is able to interoperate with any of the networked devices in the trust web via peer networking connectivity, including discovery and control.

Figure 7:
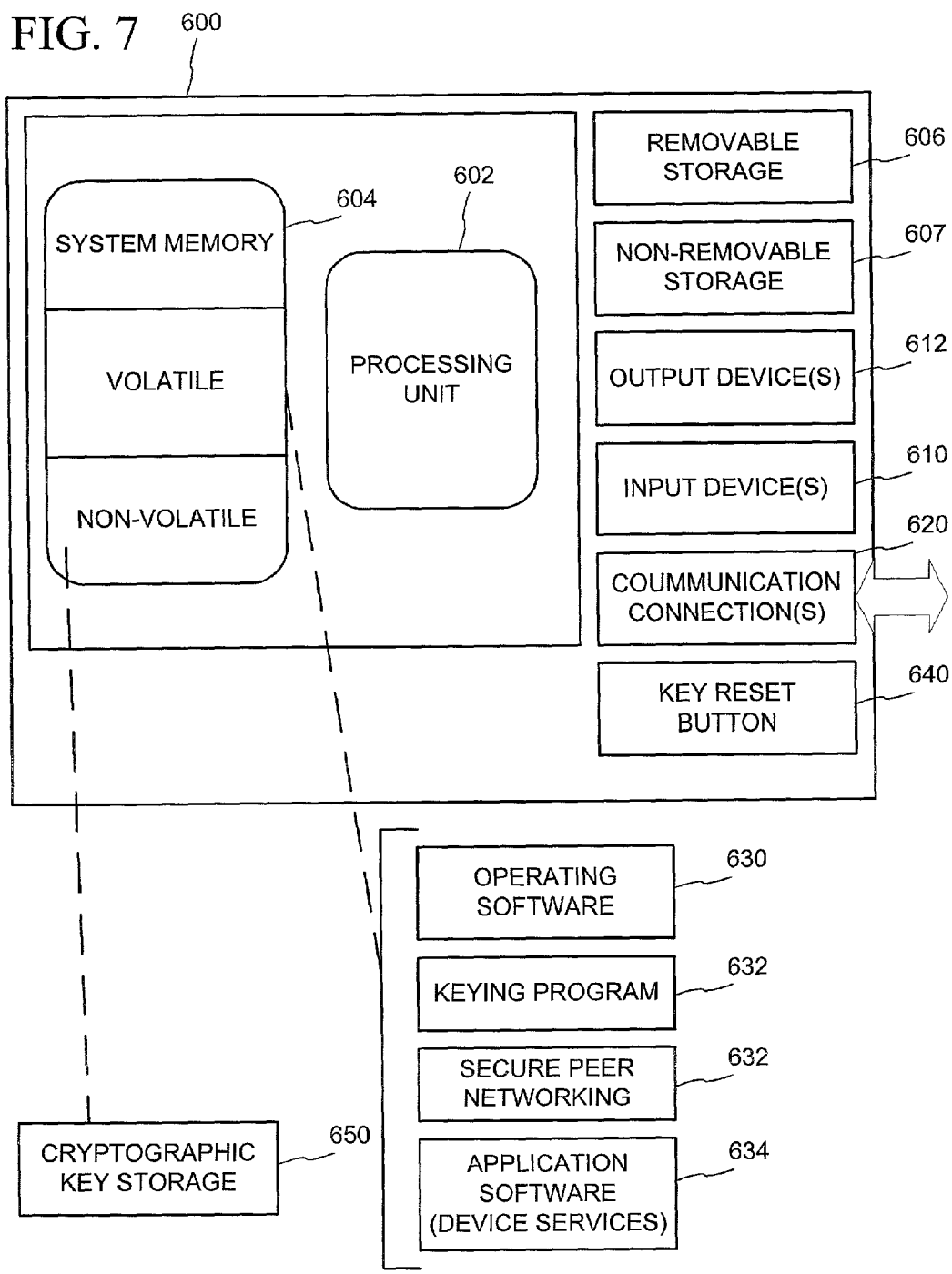
FIG. 7 is a block diagram of a computer system that may be used as the networked computing device or the keying device of FIG. 4.

With reference to FIG. 7, an exemplary device architecture 600 for the group keying device 320 or networked computing device 310 (FIG. 4) typically is configured to include a processing unit 602 (e.g., a microprocessor or micro-controller) and system memory 604. Depending on the exact configuration and type of computing device, the system memory may be volatile (such as RAM), non-volatile (such as ROM, flash memory, etc.) or some combination of the two. The non-volatile storage provides persistent cryptographic key storage 650 for the device. Additionally, the computer 600 may also have mass or secondary storage (removable 606 and/or non-removable 607) such as magnetic or optical disks or tape. The storage typically stores operating and application (e.g., device services) software 630, 634, as well as a keying program (e.g., keying utility 334 for the group keying device and re-key command interface 342 for the networked device) implementing the trust web keying process 400 for the respective group keying or networked computing device. Similarly, the computer architecture 600 may also have input devices 610 such as a keyboard, pointing device, microphone, etc., and/or output devices 612 such as display, speaker, printer, force-feedback, etc. The computer architecture 600 also typically includes network connections 620 (such as a network adapter for the data network 110 of FIG. 1) to other devices, computers, networks, servers, etc. using either wired or wireless media. Alternatively, the system components of the device may in fact be embodied in a distributed computing system. For example, a terminal device may incorporate input and output devices to present only the user interface, whereas processing component of the system are resident elsewhere. For networked computing devices of the expensive device class, the computer may include a key reset button 640 and programming to restore the device's original device-specific cryptographic key.

The computer architecture 600 typically includes at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A process of introducing a networked computing device to a trust web of peer devices on an open networking medium, such that the device can securely operate on the trust web via a peer networking connectivity protocol without requiring complex configuration, but can be re-deployed to a new trust web by anyone with possession of the device, the process comprising:

deploying the networked computing device on an open networking medium of an end user's network, wherein the device has previously been assigned a device-specific symmetric encryption key unique to the networked computing device prior to deployment on the open networking medium, such that the device is configured to accept communications in a peer networking connectivity protocol when the communications are encrypted with the device-specific symmetric encryption key, the peer networking connectivity protocol having a re-keying command operative to configure the networked computing device with a new symmetric encryption key so as to accept communication in the peer networking connectivity protocol when encrypted with the new symmetric encryption key;

after deployment of the networked computing device on the open networking medium, entering the previously-assigned device-specific symmetric encryption key into a user control point device running a management utility, thereby allowing the user control point device to communicate with the networked computing device;

causing the user control point device to transmit the re-keying command of the peer networking connectivity protocol encrypted with the device-symmetric encryption key to the networked computing device, the transmitted re-keying command specifying a group symmetric encryption key of the trust web of peer devices as the new symmetric encryption key, whereby the networked computing device is now configured to interoperate with the peer devices in the trust web on the end user's network via the peer networking connectivity protocol when encrypted with the group symmetric encryption key; and on activation of a reset function physically-located on the networked computing device, configuring the networked computing device with its original device-specific symmetric encryption key, whereby the device can be re-deployed to a new trust web.

2. The process of claim 1 comprising:

distributing the networked computing device together with an indication of the device-specific symmetric encryption key for entry into the user control point device.

3. The process of claim 1 comprising:

labeling the networked computing device with the device-specific symmetric encryption key for commercial distribution.

4. A networked computing device for configuring to securely operate in a trust web of peer devices on an open networking medium without requiring complex configuration, and such that the device can be configured to securely operate on a new trust web by a person with physical possession of the device, the peer devices communicating via an encrypted peer networking connectivity protocol using a group symmetric encryption key, the networked computing device comprising:

a peer networking connectivity protocol layer operating to transmit and receive communications per the peer networking connectivity protocol with peer devices;

an encryption layer operating to encrypt and decrypt the communications with peer devices;

a symmetric key configuration of the encryption layer initially configured before communication with other devices with an initial symmetric key specific to the networked computing device; and a re-keying command interface operative in response to a re-keying command encrypted with the symmetric key configured in the symmetric key configuration to configure the symmetric key configuration with a new symmetric key;

whereby the networked computing device is configurable upon deployment on the open networking medium to operate in the trust web of peer devices by receiving the re-keying command specifying the group symmetric encryption key as the new symmetric key to the networked computing device; and whereby the networked computing device further comprises:

a reset key activator feature physically located on the device; and programming operative responsive to user activation of the key reset activator for restoring the symmetric key configuration to the initial symmetric key.

* * * * *

UNITED STATES PATENT AND TRADEMARK OFFICE
CERTIFICATE OF CORRECTION

PATENT NO.         : 7,082,200 B2                         Page 1 of 1
APPLICATION NO.    : 09/948475
DATED              : July 25, 2006
INVENTOR(S)        : Bernard D. Aboba et al.

It is certified that error appears in the above-identified patent and that said Letters Patent is hereby corrected as shown below:

On page 2, in field (56), under "Other Publications" in column 2, line 14,
delete "Falso" and insert -- False --, therefor.

On page 2, in field (56), under "Other Publications" in column 2, line 15,
delete "Netowrks" and insert -- Networks --, therefor.

Signed and Sealed this

Twentieth Day of July, 2010

David J. Kappos
*Director of the United States Patent and Trademark Office*